July 31, 1962 W. C. KAMPF 3,047,304
CART SUPPORT
Filed July 18, 1960 2 Sheets-Sheet 1
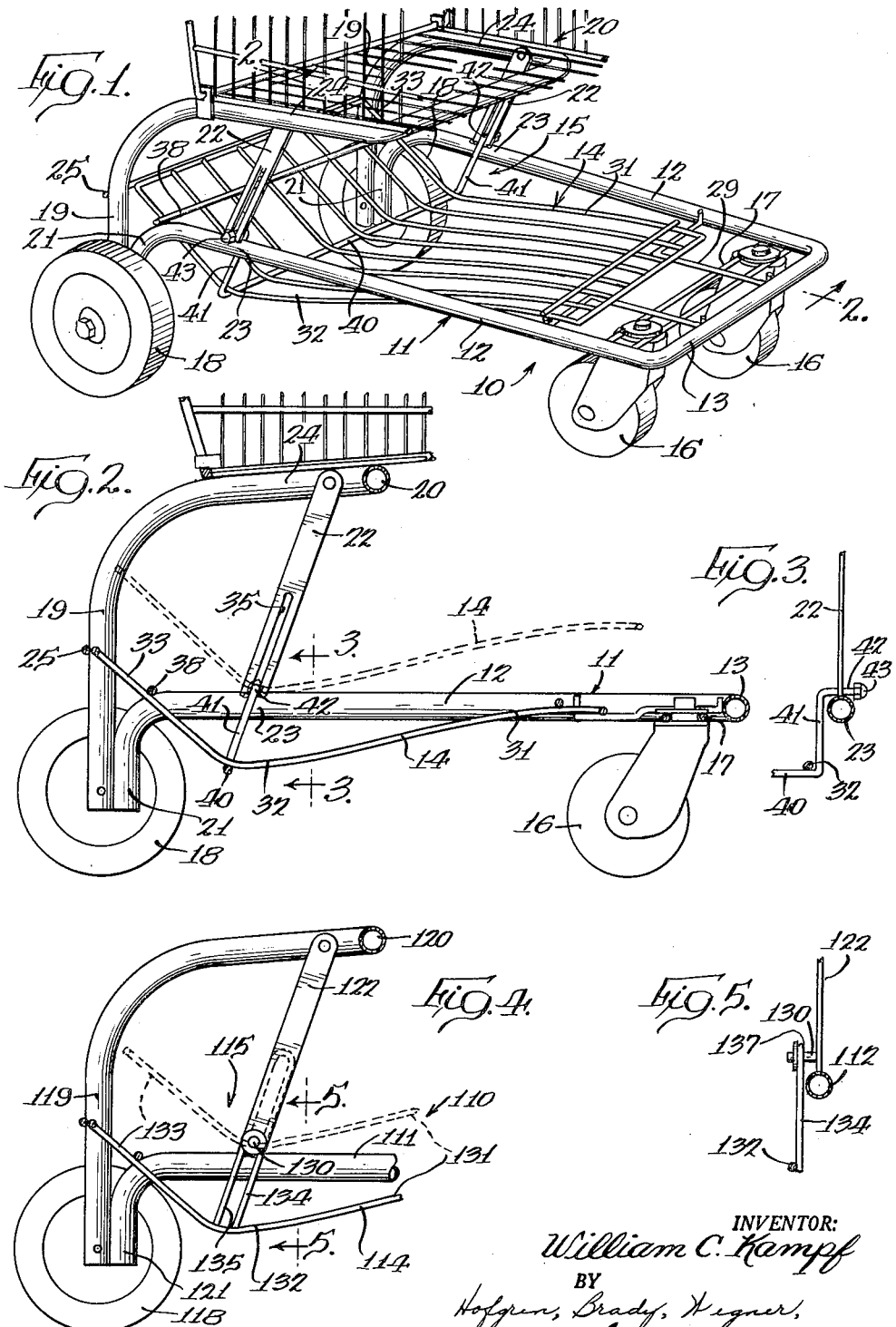
INVENTOR:
William C. Kampf
BY
Hofgren, Brady, Wegner,
Allen & Stellman
Att'ys July 31, 1962 W. C. KAMPF 3,047,304
CART SUPPORT
Filed July 18, 1960 2 Sheets-Sheet 2
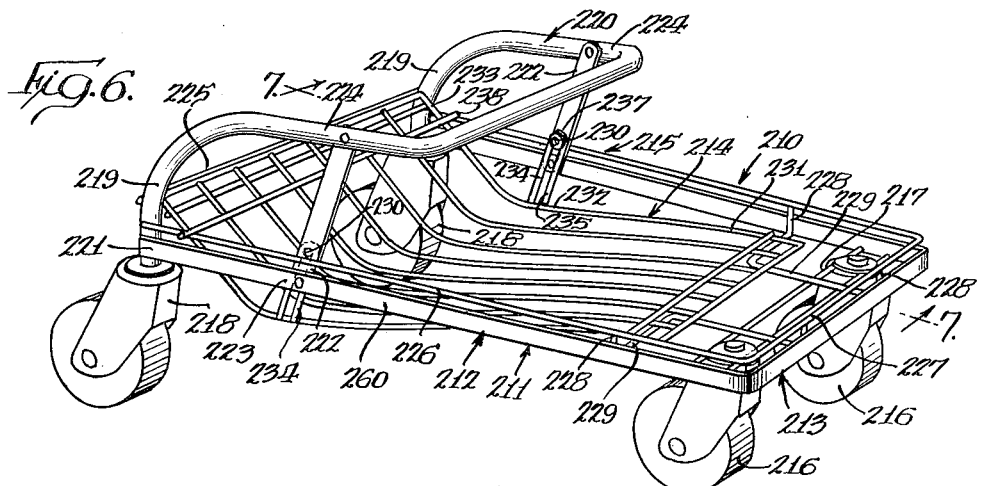
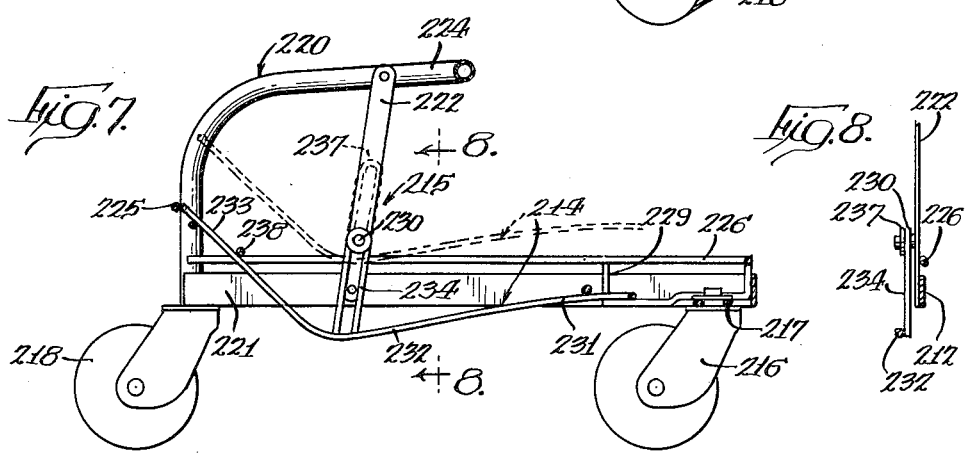
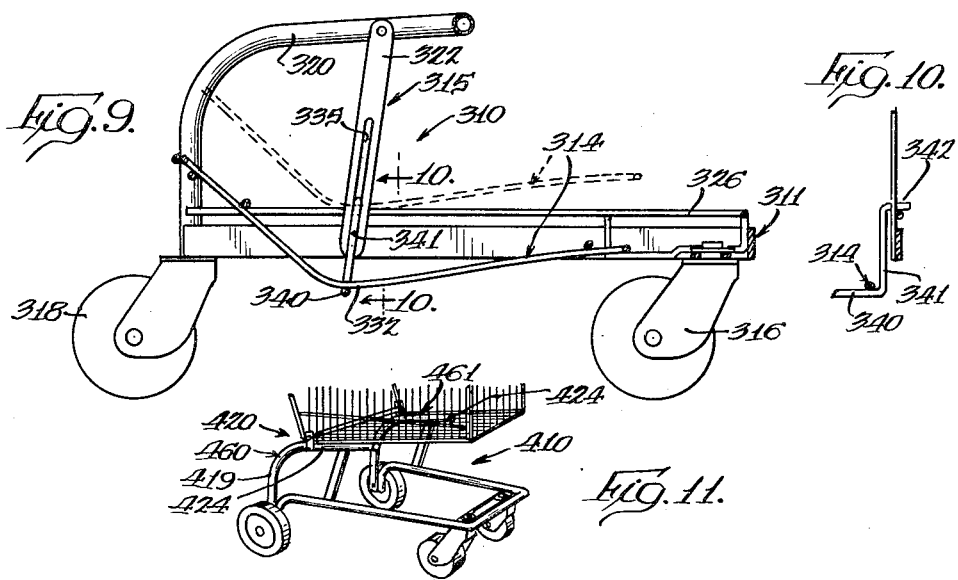

United States Patent Office 3,047,304
Patented July 31, 1962

3,047,304
CART SUPPORT
William C. Kampf, % Sides Mfg. Co., 811 Belden Road, Jackson, Mich.
Filed July 18, 1960, Ser. No. 43,619
16 Claims. (Cl. 280—33.99)

This invention relates to carts such as grocery carts, and in particular to lower platform structures for use in telescoping grocery carts.

In telescoping type grocery carts, it is desirable to provide a platform below the basket portion of the cart to carry additional goods, such as cartons of soft drinks, bags of produce such as potatoes and onions, etc. Such platforms, however, have heretobefore been somewhat limited in their capacity for holding such goods because the peripheral retaining means must be relatively low to permit the desired telescoping of a number of such carts. Further, such platforms have conventionally been inclined forwardly causing the retention of goods thereon to be relatively impositive.

Another form of telescoping grocery cart having a lower platform goods support is one wherein the platform is arranged to extend generally below the tubular base frame, or wishbone, thereby utilizing the base frame as the peripheral retaining means. As it is necessary to insert the leading edge of a second cart under the platform of a first cart during a telescoping association thereof, the platform is movably carried on the base frame structure of the cart, permitting it to be moved upwardly by the second cart base frame during such telescoping. Such movable platform structures provide substantially increased capacity and positive retention of the goods.

The present invention comprehends a new and improved cart platform structure of the type wherein the platform extends generally below the base frame and is readily movable upwardly relative to the base frame providing facilitated telescoping of a plurality of such carts.

It is a principal feature of the present invention, therefore, to provide a new and improved cart platform structure.

Another feature of the invention is the provision of new and improved means for movably mounting a cart platform structure in association with the base frame of the cart.

A further feature of the invention is the provision of such mounting means having new and improved guiding portions for facilitating movement of the platform between a lower, goods-carrying position and an upper cart-telescoped position.

Still another feature of the invention is the provision of such mounting means providing for an initial pivotal movement of the platform and a subsequent elevation of the platform as a whole in the movement thereof to the cart-telescoped position.

A still further feature of this invention is the provision of a new and improved platform structure substantially inclined rearwardly to keep goods placed thereon from sliding off the front thereof, even when the cart is substantially forwardly inclined as when it is lowered over a parking lot curb or rolled down a driveway ramp.

A yet further feature of the invention is the provision of such a platform structure having a new and improved co-operative association with a cart base frame structure for improved retention of goods thereon.

Still another feature of the invention is the provision of such a platform structure for use with a tubular base frame structure.

Other features and advantages of the invention will be apparent from the following description taken in connection with the accompanying drawing wherein:

FIG. 1 is an isometric view of a grocery cart base structure provided with platform means embodying the invention;

FIG. 2 is a longitudinal section thereof taken substantially along the line 2—2 of FIG. 1, the platform being illustrated in dotted lines in a cart-telescoped position;

FIG. 3 is a fragmentary transverse section taken substantially along the line 3—3 of FIG. 2;

FIG. 4 is a fragmentary, longitudinal section of another form of base structure embodying the invention, the cart-telescoped position of the platform thereof being illustrated in dotted lines;

FIG. 5 is a fragmentary transverse section taken substantially along the line 5—5 of FIG. 4;

FIG. 6 is an isometric view of another form of a grocery cart base structure provided with platform means embodying the invention;

FIG. 7 is a longitudinal section thereof taken substantially along the line 7—7 of FIG. 6, the platform being illustrated in dotted lines in a cart-telescoped position;

FIG. 8 is a fragmentary transverse section taken substantially along the line 8—8 of FIG. 7;

FIG. 9 is a longitudinal section of still another form of base structure embodying the invention, the cart-telescoped position of the platform thereof being illustrated in dotted lines;

FIG. 10 is a fragmentary transverse section taken substantially along the line 10—10 of FIG. 9; and FIG. 11 is a reduced isometric view of another form of grocery cart base structure embodying the invention.

In the exemplary embodiment of the invention as disclosed in FIGS. 1, 2 and 3 of the drawing, a grocery cart base structure generally designated 10 includes a U-shaped tubular base frame 11 having a pair of spaced side members 12 and a front member 13. A goods-carrying platform generally designated 14 is carried in base structure 10 for movement between a lower goods-carrying position shown in full lines in FIG. 2 and an upper cart-telescoped position shown in broken lines in FIG. 2. This movement of the platform is controlled by a guide means generally designated 15 assuring a smooth positive transposition therebetween.

More specifically, base structure 10 includes a pair of front casters 16 carried by a wire frame 17 secured to the base frame 11 rearwardly adjacent front member 13. The rear of the base frame is carried by a pair of rear wheels 18 mounted on the downturned legs 19 of a U-shaped upper basket support means generally designated 20. Legs 19 are secured to downturned rear portions 21 of side members 12 as by welding, and a pair of guide members, or support bars, 22 are secured at their lower ends to a mid-portion 23 of the side members 12 and at their upper ends to a forward portion 24 of the basket support 20. If desired, a cross rod 25 may be secured at its opposite ends to legs 19 of the basket support 20 to reinforce the base structure 10 at the rear thereof. Platform 14 includes a front portion 31, a medial portion 32, and a rear portion 33 extending rearwardly upwardly from the medial portion.

In the goods-carrying position, the forward portion 31 of the platform 14 rests on two L-shaped supports 29 at the forward end of the base frame and the medial and rear portions of the platform are supported by the guide means 15. To preclude a pivoting of the platform about the guide means 15 as by a person depressing the rear portion 33 of the platform with his foot, or by the placement of a heavy article on the rear portion 33, a stop rod 38 may be secured to the rear portion 33 to extend transversely thereacross and overlie the side members 12 adjacent the rear ends 21 thereof. More specifically, guide means 15 comprises a rod 40 extending transversely under the medial portion 32 of platform 14 and provided at its opposite ends with upturned legs 41 terminating in outturned portions 42 fitted with an end cap 43. Each of support bars 22 is provided with an elongated slot 35 through which outturned ends 42 of the rod 40 are transversely slidable. Thus, rod ends 42 effectively define posts having sliding association in slots 35 of the supports for guiding the platform 14 between the lower goods-receiving position shown in full lines in FIG. 2 and the upper cart-telescoped position shown in dotted lines in FIG. 2.

As a result of the improved arrangement of platform 14 and the associated base frame structure, an improved facilitated carrying of goods is provided thereby. Small objects, such as canned goods, may be carried on platform 14 without fear of inadvertent displacement therefrom in the ordinary use of the grocery cart while yet the goods on platform 14 are readily accessible at all times. Inadvertent dumping of the goods from the platform by accidental tipping of the platform is effectively precluded. Further, not only does the recessed arrangement of the platform below the level of base frame 11 provide improved positive retention of the goods thereon but also provides an improved carrying capacity of the platform.

When it is desired to telescope a plurality of grocery carts provided with such base structures, the rearmost cart is merely pushed forwardly to urge its front member forwardly against the inclined rear portion 33 of the front cart platform. This engagement causes the rear portion 33 to move upwardly and slightly forwardly under the guiding action of the rod ends 42 in sliding associated with the supports 22 in the slots 35 thereof. During this initial movement, guide means 15 causes the platform medial portion 32 and rear portion 33 to move upwardly in a direction generally parallel to the extension of supports 22 while the front portion 31 of the platform effectively pivots on the L-shaped supports 29. However, as the front member of the rear cart moves further forwardly to become disposed under the medial portion 32 of the platform 14, the front portion 31 of the platform 14 is spaced upwardly from support 29, as shown in dotted lines in FIG. 2, permitting the rear cart to telescope fully into the forward cart with substantially improved facility.

In separating the telescoped carts, the two cars are merely pulled apart allowing the platform 14 to fall by action of gravity back to the full line position of FIG. 2 wherein, once again, the platform provides an improved goods-carrying means.

Turning now to the embodiment of the invention illustrated in FIGS. 4 and 5, a base structure generally designated 110 generally similar to the base structure 10 but having a modified form of guide means 115 is shown. Thus, reference numerals similar to the reference numerals designating the elements of base structure 10, but 100 higher, are employed to designate corresponding elements of base structure 110.

More specifically, guide means 115 includes a pair of posts 130 carried one each on the support bars 122. Extending upwardly and slightly forwardly from the opposite sides of the medial portion 132 of the platform is a pair of elongated guide members 134 defining an elongated slot 135 slidably receiving the post 130. Herein elongated guide members 134 comprise hairpin-shaped rod elements, slot 135 being defined by the legs thereof. The lower ends of the guide member legs are secured, as by welding, to the medial portion 132 of platform 114. The length of the elongated guide members 134 is such that when the bight 137 thereof engages the post 130, the medial portion 132 of platform 114 is disposed substantially below the level of tubular base frame 111 thereby effectively defining with base frame 111 an upwardly opening goods-carrying receptacle.

Referring now to FIGS. 6 through 8, another form of base structure generally designated 210 is shown to comprise a base structure generally similar to base structure 110 but having a modified form of base frame 211 wherein the side members 212 and front member 213 comprise, in lieu of the tubular structure of base frame 111, a flat bar U-shaped lower portion 260 and a retaining rail 226 disposed slightly above the lower portion 260 to provide improved retention of goods on the platform 214. The retaining rail comprises a U-shaped rod member having its forward portion 227 carried by a pair of upturned ends 228 of a pair of L-shaped supports 229 provided at each of the opposite sides of the front of the base frame. The retaining rail may further be secured to the support bars 222 and the downturned legs 219 of the basket support to provide a rigid retaining rail mounting.

A stop rod 238 carried on the rear portion 233 of the platform engages the retaining rail 226 adjacent the basket support leg 219 to limit the downward movement of the rear portion of the platform. In all other respects, the functioning of the construction of cart base structure 210 is similar to the construction of cart base structure 110. The other elements of the base structure 110 which are similar to corresponding elements of base structure 10 are identified by similar numerals but two hundred higher.

Turning now to the embodiment of FIGS. 9 and 10, still another form of cart base structure generally designated 310 is shown to comprise a cart base structure generally similar to cart base structure 10 except that the base frame 311 comprises a combination flat bar lower portion and a superposed rod retaining rail portion similar to the base frame portions of cart base structure 210. Cart base structure 310 is generally similar to cart base structures 10 and 210 in all other respects, elements of cart base structure 310 corresponding to similar elements of base structures 10 and 210 being designated by similar numbers but 300 or 100 higher respectively.

Referring now to FIG. 11, yet another form of grocery cart base structure generally designated 410 is shown to comprise a base cart structure generally similar to base cart structure 10 but provided with a basket support 420 comprising a pair of spaced L-shaped members 460 and 461 each having a downturned leg 419 somewhat shorter than the downturned leg 19 of basket support 20 to dispose the horizontal portion 424 of the L-shaped members at a lower elevation than at which the portions 24 of basket support 20 are disposed. Further, no cross portion is provided between the forward ends of the support portions 424; thus, additional clearance is provided below the basket bottom and the uppermost surface of the platform. In all other respects, base cart structure 410 is similar to base cart structure 10.

The improved platform and platform mounting structure in each of the embodiments of the invention disclosed above provides a facilitated telescoping or nesting of the carts. By firstly raising the rear portion of the platform with the front portion thereof pivotally carried on the supports 29, facilitated entrance of the front frame member 13 of a second cart to be nested with a first cart is effected. As the front frame member 13 of the second cart moves further under the platform of the first cart to move the platform to the uppermost position thereof, the upward movement is converted from a pivotal action to a pure lifting action whereby the entire platform is raised in the final position including each of the forward and rearward ends thereof thereby facilitating the successive nesting of a plurality of such carts in this manner. Thus, the present invention provides a substantial improvement in the nesting action as compared to previous platform structures.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. In a telescoping shopping cart, a base frame having a pair of spaced side members and a front member; a platform carried by said base frame to extend generally intermediate said side members, said platform having front, medial, and rear portions, said rear portion extending rearwardly upwardly to terminate at an elevation at least equal to the elevation of the top of said front member; and co-operating slide means on said base frame and medial portion of said platform slidingly guiding the medial portion of the platform upwardly as a result of an upward movement of the rear portion thereof as by movement of the front member of another such shopping cart forwardly against said rear portion of the platform.

2. In a telescoping shopping cart, a base frame having a pair of spaced side members and a front member; a platform carried by said base frame to extend generally intermediate said side members, said platform having front, medial, and rear portions, said rear portion extending rearwardly upwardly to terminate at an elevation at least equal to the elevation of the top of said front member; a support on the base frame adjacent said front member removably supporting the front portion of the platform; and co-operating slide means on said base frame and medial portion of said platform slidingly guiding the medial portion of the platform upwardly as a result of an upward movement of the rear portion thereof as by movement of the front member of another such shopping cart forwardly against said rear portion of the platform.

3. In a telescoping shopping cart, a base frame having a pair of spaced side members and a front member; a platform carried by said base frame to extend generally intermediate said side members, said platform having front, medial, and rear portions, said rear portion extending rearwardly upwardly to terminate at an elevation at least equal to the elevation of the top of said front member; co-operating slide means on said base frame and medial portion of said platform slidingly guiding the medial portion of the platform upwardly as a result of an upward movement of the rear portion thereof as by movement of the front member of another such shopping cart forwardly against said rear portion of the platform; and stop means on said base frame and said platform co-operating to limit the downward movement of the platform to a preselected position.

4. In a telescoping shopping cart, a base frame having a pair of spaced side members and a front member; a platform carried by said base frame to extend generally intermediate said side members, said platform having front, medial, and rear portions, said rear portion extending rearwardly upwardly to terminate at an elevation at least equal to the elevation of the top of said front member; co-operating slide means on said base frame and medial portion of said platform slidingly guiding the medial portion of the platform upwardly as a result of an upward movement of the rear portion thereof as by movement of the front member of another such shopping cart forwardly against said rear portion of the platform; and stop means on said base frame and said platform co-operating to limit the downward movement of the platform to a preselected position wherein said medial portion of the platform is below the base frame.

5. In a telescoping shopping cart, a base frame having a pair of spaced side members and a front member; a platform carried by said base frame to extend generally intermediate said side members, said platform having front, medial, and rear portions, said rear portion extending rearwardly upwardly to terminate at an elevation at least equal to the elevation of the top of said front member; a pair of guide members each having an elongated slot extending upwardly from one of said base frame and said medial portion of the platform; and a pair of guide elements on the other of said base frame and medial portion of the platform cooperating with the guide member slots to guide the medial portion of the platform upwardly from a lower position to an upper position as a result of an upward movement of the rear portion thereof as by movement of the front member of another such shopping cart forwardly against said rear portion of the platform.

6. The cart of claim 5 wherein the lower position is below the base frame.

7. The cart of claim 5 wherein said guide members comprise elongated members extending upwardly from a mid-portion of the base frame side members.

8. The cart of claim 5 wherein said guide members comprise elongated members extending upwardly from said medial portion of the platform.

9. The cart of claim 8 wherein said elongated members comprise hairpin-shaped rods having the legs thereof secured to said medial portion of the platform.

10. The cart of claim 5 wherein said elements comprise posts slidable in said slots.

11. The cart of claim 5 wherein said elements comprise rod members having a lower end secured to said other of the base frame and medial portion of the platform, and a turned upper end slidable in the guide member slots.

12. In a telescoping shopping cart, a base frame having a pair of spaced side members and a front member; a platform carried by said base frame to extend generally intermediate said side members, said platform having front, medial, and rear portions, said rear portion extending rearwardly upwardly to terminate at an elevation at least equal to the elevation of the top of said front member; co-operating slide means on said base frame and medial portion of said platform slidingly guiding the medial portion of the platform upwardly as a result of an upward movement of the rear portion thereof as by movement of the front member of another such shopping cart forwardly against said rear portion of the platform; and rod means on said rear portion of the platform removably engaging a rear portion of the base frame side members to limit the downward movement of the rear portion of the platform.

13. The cart of claim 12 wherein the base frame is provided with a superjacent rod frame and said rod means on the rear portion of the platform engages the rear portion of said rod frame.

14. In a telescoping shopping cart, a base frame having a pair of spaced side members and a front member; a platform carried by said base frame to extend generally intermediate said side members, said platform having front, medial, and rear portions, said rear portion extending rearwardly upwardly to terminate at an elevation at least equal to the elevation of the top of said front member; a basket support means extending upwardly from and overlying the base frame; a pair of guide members extending upwardly from the side members of the base frame to the overlying basket support means; co-operating slide means on said guide members and the medial portion of the platform slidingly guiding the medial portion of the platform upwardly from a lower position to an upper position as a result of an upward movement of the rear portion thereof as by movement of the front member of another such shopping cart forwardly against said rear portion of the platform.

15. In a telescoping shopping cart, a tubular U-shaped base frame defining a pair of spaced side members and a front member; a platform carried by said base frame to extend generally intermediate said side members, said platform having front, medial, and rear portions, said rear portion extending rearwardly upwardly to terminate at an elevation at least equal to the elevation of the top of said front member; and co-operating slide means on said base frame and medial portion of said platform slidingly guiding the medial portion of the platform upwardly as a result of an upward movement of the rear portion thereof as by movement of the front member of another such shopping cart forwardly against said rear portion of the platform.

16. In a telescoping shopping cart, a base frame having a pair of spaced side members and a front member; a platform carried by said base frame to extend generally intermediate said side members, said platform having front, medial, and rear portions, said rear portion extending rearwardly upwardly to terminate at an elevation at least equal to the elevation of the top of said front member; a basket support means extending upwardly from and overlying the base frame; a pair of guide members extending upwardly from the side members of the base frame to the overlying basket support means; a pair of elongated members extending upwardly from the medial portion of the platform; and slide means on the guide members co-operating with the elongated members for slidingly guiding the medial portion of the platform upwardly from a lower position to an upper position as a result of an upward movement of the rear portion thereof as by movement of the front member of another such shopping cart forwardly against said rear portion of the platform.

References Cited in the file of this patent

UNITED STATES PATENTS

| | | |
|---|---|---|
| 2,812,187 | Nicholl et al. | Nov. 5, 1957 |
| 2,868,556 | Cauthon | Jan. 13, 1959 |
| 2,871,624 | Young | Jan. 17, 1959 |
| 2,882,062 | Hoedinghaus et al. | Apr. 14, 1959 |
| 2,903,269 | Hennion | Sept. 8, 1959 |

FOREIGN PATENTS

| | | |
|---|---|---|
| 1,194,860 | France | May 11, 1959 |